March 7, 1967  J. N. HINCKLEY  3,307,488
POSITIVE DISPLACEMENT ROTARY PUMPS
Filed Oct. 23, 1965  11 Sheets-Sheet 1

INVENTOR.
JOHN N. HINCKLEY
BY LeRoy J. Leishman
AGENT

March 7, 1967  J. N. HINCKLEY  3,307,488
POSITIVE DISPLACEMENT ROTARY PUMPS
Filed Oct. 23, 1965  11 Sheets-Sheet 2

INVENTOR.
JOHN N. HINCKLEY
BY LeRoy J. Reishman
AGENT

March 7, 1967 J. N. HINCKLEY 3,307,488
POSITIVE DISPLACEMENT ROTARY PUMPS
Filed Oct. 23, 1965 11 Sheets-Sheet 3

*INVENTOR.*
JOHN N. HINCKLEY
BY
LeRoy J. Reishman
AGENT

March 7, 1967 J. N. HINCKLEY 3,307,488
POSITIVE DISPLACEMENT ROTARY PUMPS
Filed Oct. 23, 1965 11 Sheets-Sheet 4

INVENTOR.
JOHN N. HINCKLEY
BY LeRoy J. Leishman
AGENT

March 7, 1967　　　J. N. HINCKLEY　　　3,307,488
POSITIVE DISPLACEMENT ROTARY PUMPS

Filed Oct. 23, 1965　　　　　　　　　　　　11 Sheets-Sheet 6

INVENTOR.
JOHN N. HINCKLEY
BY *LeRoy J. Leishman*
AGENT

United States Patent Office 3,307,488
Patented Mar. 7, 1967

3,307,488
POSITIVE DISPLACEMENT ROTARY PUMPS
John N. Hinckley, 16052 Leffingwell Road,
Whittier, Calif. 90603
Filed Oct. 23, 1965, Ser. No. 503,628
26 Claims. (Cl. 103—124)

This application is a continuation-in-part of the application of John N. Hinckley, Serial No. 158,662, filed December 12, 1961, now Patent No. 3,240,157 for improvements in rotary pumps.

The invention pertains more particularly to rotary pumps of the positive displacement type used for fluids, mixtures and semi-solids, such, for example, as those required by the food and dairy industries for pumping milk, cottage cheese and other flowable products.

The pumps described in the present application embody many improvements over those illustrated and described in the Hinckley patents, No. 2,717,555 and No. 2,882,828, which issued on September 13, 1955 and April 21, 1959, respectively.

In pumps of the type with which we are here concerned, extreme sanitation and cleanliness are prime requirements, and it is highly important that the design be such that the cleaning may be easily and quickly accomplished. In accordance with these requirements, it is desirable, among other things, that narrow crevices, sharp corners and deep holes be avoided in the design.

In keeping with the aforementioned considerations, the principal objects of the invention are to produce a pump for liquids, semi-solids and mixtures of solids and liquids that is efficient and relatively inexpensive to manufacture, and to provide a design that will permit the pump to be easily and thoroughly cleaned in place, as by flushing, or manually cleaned after only partial disassembly.

In order to achieve these ends, the invention has the following subsidiary objects:

(1) The provision of an efficient seal between the liquid-containing cavity of the pump and the drive-shaft and its bearings;

(2) The provision of a rotor and a driving means for the rotor of such design that a bearing is required for only one end of the shaft;

(3) The provision of simple and effective means for keying a removable rotor to the drive-shaft;

(4) The provision of a rotor and a drive-shaft of such design that the rotor may be sealed off at one end to prevent fluid from getting between the rotor and the drive-shaft;

(5) The provision of a pump of the type described in which the axial thrusts on the rotor produced by either pressure or vacuum will always be in the same axial direction in order to eliminate end play and vibration;

(6) The provision of a tolerance accumulation device that may be adjusted to compensate for all tolerance variations in the components and that will always receive the forces directed against the rotor by the vacuum or hydraulic pressure of the material being pumped;

(7) The provision of clean-out slots in the end plates of the rotor housing of such design that any of the material being pumped that may get between the rotor and the end plates may easily be flushed out;

(8) The provision of a pump of such design that tapered roller bearings or other thrust bearings will absorb all the end thrust that is exerted against the aforementioned tolerance accumulation device;

(9) The provision in a pump of the type described in which oscillating arms similar to those described in the previously mentioned Hinckley patents may be more accurately positioned in the pump casing;

(10) The provision of means whereby wear between the said oscillating arms and the adjacent end plates may be reduced to a minimum.

This invention possesses many other advantages, and has other objects which may be made more clearly apparent from a consideration of illustrative embodiments of the invention. For this purpose such embodiments are shown in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the figures:

FIG. 12 is described in connection with FIG. 10;

FIGS. 14 and 15 are described in connection with FIG. 10;

FIGS. 1 to 9, 11, 13, and 16 to 20, are identical to the figures bearing the same numbers in the parent application, while FIGS. 10, 12, 14 and 15 illustrate the action of the rotor.

For convenience in referring to the components of the presently preferred embodiment which are described for the first time in the instant application, they have been given reference numerals 200 higher than the corresponding parts in the embodiments that were illustrated in the parent application.

The components shown in FIGS. 10, 12, 14 and 15, which are common to various illustrative embodiments of the invention, have been given reference numerals 300 higher than were used for their counterparts in the parent application.

In the embodiments of the invention shown and described herein, a generally cylindrical casing 1 is closed at opposite ends by flat plates 2 and 3 to form a chamber for the principal parts of the pump, and the housing 4 supports and protects the bearings for the drive shaft. The casing 1 has an inlet port 7 and an outlet port 8.

Figure 5:
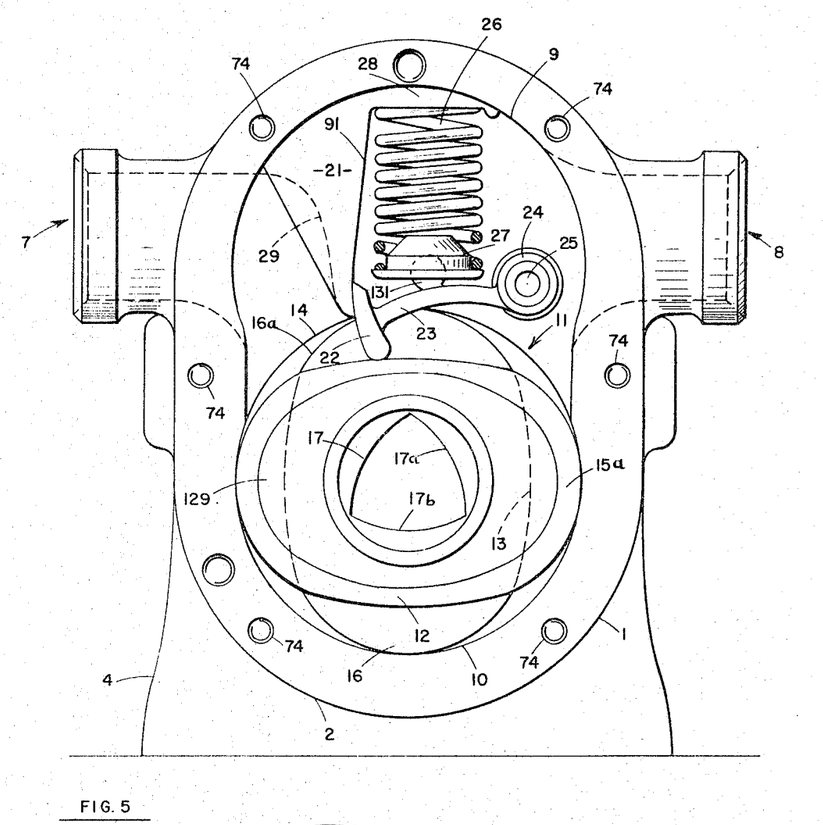
FIG. 5 is a cross-section taken on line 5—5 of FIG. 1.

For simplicity of manufacture and to provide an easily cleanable interior surface, it is desirable to use a casing similar to that shown in FIG. 5, where the outer end plate has been removed to show the interior construction. It will be observed that a cross-section of the casing reveals an oblong body with an upper semi-cylindrical bore 9 and an overlapping lower semi-cylindrical bore 10. The rotor 11 fits in the lower bore 10. The rotor may be generally of the construction disclosed in the earlier Patents No. 2,717,555 and No. 2,882,828, both of which have been mentioned previously.

Figures 7, 8, 9, 16:
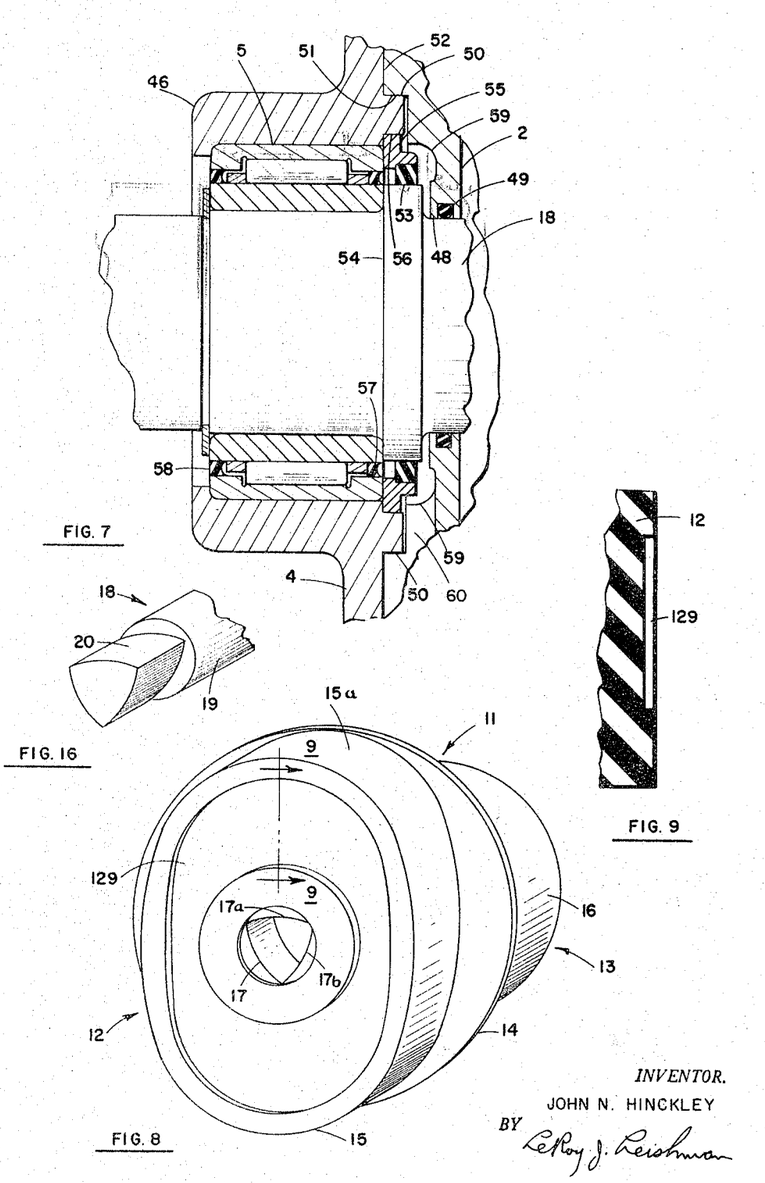
FIG. 7 is a partial longitudinal section through the rear plate of the pump casing and the adjacent portion of the bearing housing, showing the cooperation between the two and a method of producing an effective seal around the shaft between the casing and the bearings for the shaft.
FIG. 8 is an isometric view of a rotor assembly showing two impellers with a separating disc and certain other structural features of the rotor.
FIG. 9 is a section taken on line 9—9 of FIG. 8.
FIG. 16 is a broken-away isometric view of the outer portion of the drive-shaft to drive the impeller assembly of FIG. 8.
Figure 10:
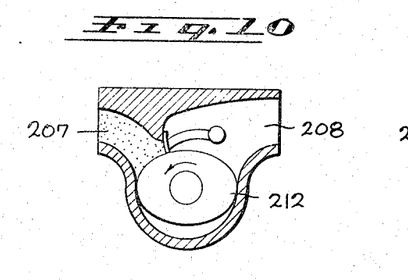
FIGS. 10, 12, 14 and 15 show different positions of the rotor and the associated oscillating arm during each revolution of the rotor in the pumping cycle.

A somewhat improved rotor, shown in an isometric view in FIG. 8, has a cosine shape and comprises two impellers 12 and 13 disposed at right angles to each other with a circular disc 14 between them. Both of these impellers are of symmetrical design, and each has a short diameter and a long diameter that are at right angles to each other to form two lobes. Impeller 12 comprises lobes 15 and 15a, and impeller 13 has two lobes 16 and 16a, FIG. 5.

At least the periphery of each of these impellers is formed of a rubber-like material or a plastic substance and the entire rotor is keyed to a drive shaft 18 in any of a variety of ways. One suitable keying arrangement is illustrated in FIGS. 5, 8 and 16. It will be observed that the center opening in impeller 12 is not round but that the recess has three arcuate sides 17, 17a and 17b, whose radii are each greater than the greatest distance from the associated side to the axis of the impeller. This three-arcuate-sided opening may communicate with a cylindrical opening in impeller 13. The reduced outer end 20 of the drive shaft must of course have arcuate sides, as illustrated in FIG. 16 to conform with the arcuate sides 17, 17a and 17b of the recess in the outer end of the double impeller structure. In assembly, the end of the rotor structure having the cylindrical opening must first be slipped over the end 20 of the drive shaft 18 and then over the round portion 19 of the shaft.

The keying arrangement just described has the great advantage that all portions of the three-arcuate-sided part of the shaft are in driving contact with the contiguous portions of the recess bounded by sides 17, 17a and 17b.

Figure 6:
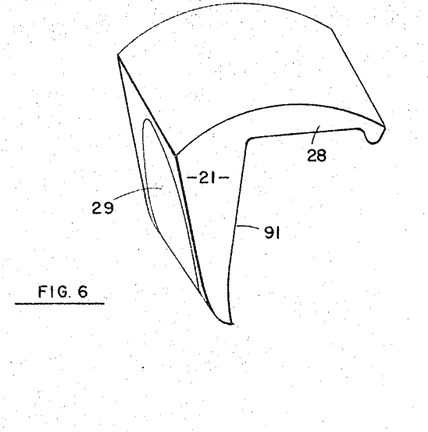
FIG. 6 is an isometric view of a removable partition that is a component of the structure shown in FIG. 5.

In the embodiment illustrated in FIG. 5, a removably mounted partition 21, also shown in FIG. 6, extends from the upper interior surface or ceiling of the pump to the disc 14 that is positioned between the two impellers. The surface 91 of this partition is parallel to the axis of the rotor.

This removably mounted partition constitutes an important improvement over the partition that is integrally formed in the corresponding upper portion of the pumps described in the earlier patents above mentioned. The upper surface of partition 21 is arcuately formed to match the arcuate upper inner surface of the pump and may be attached thereto by any convenient means.

The vane 22 constitutes a movable partition extending from the stationary partition 21 to the periphery of impeller 12. This vane is integral with an arm 23 which terminates in a boss 24, and the construction is generally the same as the construction of the corresponding movable vane member in the earlier patents above referred to. It will be understood that another similar vane, arm and hub structure cooperates with partition 21 and the other impeller 13 on the opposite side of the circular disc 14—all substantially as shown in the aforementioned earlier patents. Hub 24 and the corresponding hub that cooperates with the other vane are mounted on a removable shaft 25, the ends of which may be removably inserted in appropriate holes in the two end plates, just as shaft 49 is mounted in the structure illustrated in FIG. 5 of the aforementioned Patent No. 2,882,828. A compression spring 26 expands between extension 28 of partition 21 and the spring cup or cap 27 that pivots on the ball 131 integrally attached to arm 23. It will of course be understood that another identical spring cooperates with the aforementioned other vane, arm and hub structure associated with impeller 13 on the opposite side of the central disc 14.

The rear surface 29 of partition 2 is hollowed out as indicated in FIGS. 5 and 6 in order to present a smooth surface to direct the inflowing substances from port 7 toward the impellers.

Figure 3:
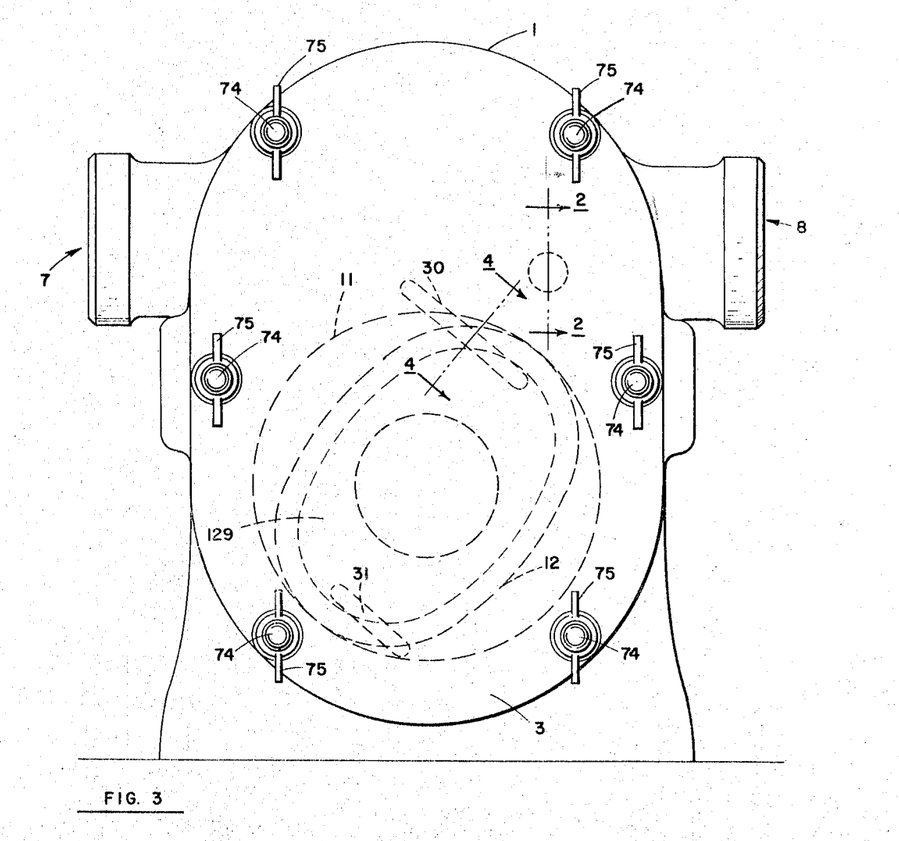
FIG. 3 is a front end view of the pump illustrated in FIG. 1, showing certain parts in phantom, including grooves on the inner surfaces of the end plates to cooperate with cavities in the ends of the impellers for entrapping some of the material being pumped so that this material may act as a cushion to maintain a hydraulic balance of the impellers for minimizing or removing end play.
Figure 4:
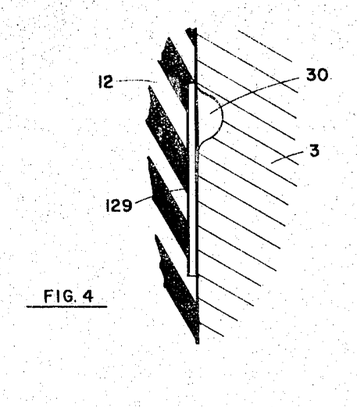
FIG. 4 is a partial cross-section taken on line 4—4 of FIG. 3, showing the cooperation of one of the aforementioned grooves with the cavity in the adjacent impeller.

Inasmuch as the two impellers are at right angles to each other, it will readily be understood that the two-cycle operation of each impeller is 90° out of phase with that of the other. This means that the pressure exerted by the inflowing material against one side of disc 14 is likewise 90° out of phase with the pressure exerted against the opposite side of the disc. In each case the pressure urges the disc and the whole rotor assembly toward the opposite end plate. This tends to create vibration. Means have been introduced in the pump illustrated in FIGS. 3, 4, 5, 8 and 9 to cushion the impellers and the end plates against these pressures that tend to cause rhythmic oscillation of the impeller assembly along the shaft To effect such cushioning, continuous shallow recesses 129 are provided in the end surfaces of the two lobes of each impeller, as illustrated in FIGS. 3, 4, 5, 8, 9 and 14, and two elongated recesses 30 and 31, FIGS. 3 and 4, are provided in each of the two end plates. As the impellers turn, the shallow recesses 129 in the outer surfaces of the lobes traverse the elongated grooves or cavities 30 and 31 in each of the end plates. As each traversal begins, some of the milk or other fluid being impelled through the pump, becomes entrained between the end of the impellers and the inner surfaces of the end plates. This entrapped fluid acts as a cushion against the aforementioned longitudinal oscillation or vibration of the rotor or impeller assembly. The elimination or reduction of this reciprocating force on the impeller assembly of course produces smoother and quieter operation and increases the life of the pump.

It is of the utmost importance in pumps of the type with which we are here concerned that the liquid or semiliquid material being impelled be kept from coming in contact with the shaft bearings. In the embodiment of the invention to which FIGS. 1 and 7 pertain, the drive-shaft may be provided with a pair of bearings, such as bearings 5 in the bearing box 46 of these figures and a second similar bearing (not shown) in box 47, FIG. 1. Both of these boxes may be integral with the housing 4. End plate 2 of the pump casing has a central opening 48, to permit shaft 18 to pass therethrough, as indicated in FIG. 7. The inner periphery of this central opening 48 is provided with an annular groove in which nests an O-ring, quad-ring, or the equivalent. This ring 49 embraces shaft 18 and provides a barrier to prevent the material that is being impelled through the pump from passing through the opening 48.

In order to assure substantially perfect alignment of the bearing 5 and the opening 48 with its trapped O-ring 49 within the end plate 2, the surface of the bearing housing that is adjacent to plate 2 is provided with an annular boss or protrusion 50 that mates with an annular recess 51 in plate 2 around the central opening 48. The annular boss 50 and the cavity 51 in plate 2 of course have mating contours; in fact, it is preferable that the boss 50 have an abrupt shoulder to fit the cylindrical sides of the cavity 51 when the front surface 52 of the bearing housing is in firm contact with the adjacent surface of end plate 2. The snug fit of boss 50 within cavity 51 assures highly satisfactory alignment of O-ring 49 with the shaft 18.

An additional, or second, barrier or resilient annular sealing member is also provided. This is the rubber or leather ring 53 that hugs the enlarged section 54 of the shaft. A shaft seal back-up ring 55 is interposed between the bearing seal 53 and the internal shoulder 56 within the boss 50 of the bearing housing. Still a third seal is provided by the neoprene or equivalent bearing ring 57 that also serves to hold the lubricant within the bearing and keep moisture out. Another bearing seal 58 is also employed on the opposite side of the bearing.

As an added safeguard against the passage of liquid from the interior of the pump casing into the bearing 5, an additional annular recess 59 is formed in the endplate 2. This recess communicates with a drainage channel 60, extending to the bottom of the pump casing. Any fluid that escapes from the interior of the pump despite the sealing action of the O-ring 49 is almost entirely drained off by gravity through the passageway 60 before reaching the bearing seals 53 and 57.

Figure 13:
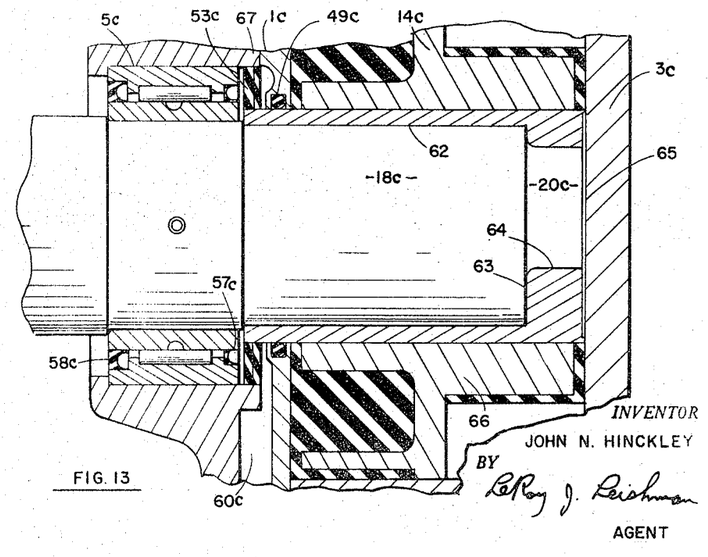
FIG. 13 is a longitudinal section, partly broken away of one species of my invention in which novel and multiple sealing means are used between the impeller and the specially formed driving shaft employing a unique arrangement for keying the shaft and rotor.
Figure 14:
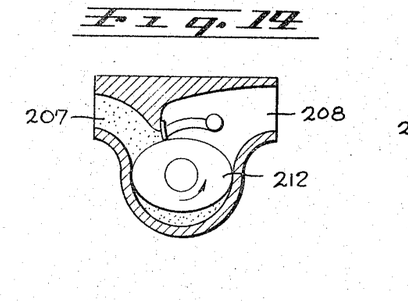
Figure 15:
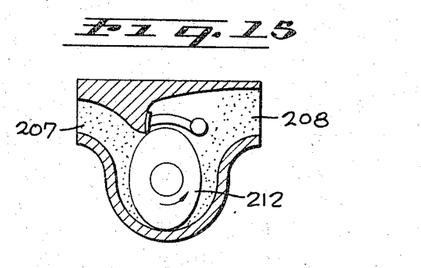
Figure 17:
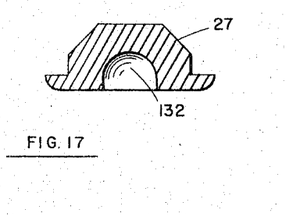
FIGS. 17 and 18 are illustrations of alternative members for imposition between compression springs such as those shown in FIG. 5 and the associated oscillating partitions or vanes.
Figure 18:
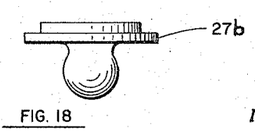

FIG. 13 illustrates another arrangement which the sealing provisions have been carried a step further. In this embodiment of the invention, the shaft 18c is provided with an eccentrically disposed reduced end 20c, which fits in a sleeve 62 having a thick wall or bottom 63 at its outer end. This thick wall is drilled or bored eccentrically so that when the main portion of shaft 18c is fitting inside the relatively thin walls of the sleeve 62, the eccentric reduced end of the shaft will fit in the eccentric mating opening 64 in the end of the sleeve. A disc 65 is welded or cemented to the outer end of sleeve 62 to provide a leak-proof seal.

The rotor 66 is centrally apertured to fit over the sleeve 62 to which it should be welded or cemented. Any of the fluid being impelled through the pump by the rotor 66 can thus not reach the shaft 18c proper, but the entire rotor assembly including the sleeve 62 may be moved longitudinally with respect to the shaft 18c. The eccentric reduced end 20c fitting in the mating eccentric opening 64 avoids any relative angular movement between the sleeve and the shaft and provides an excellent keying arrangement whereby the shaft rotates the impeller assembly 66.

In this embodiment of the invention, the central opening in the end plate 1c is large enough to receive the sleeve 62, and a sealing ring 49c, which is the counterpart of the O-ring 49, FIG. 7, nests in an annular recess on the inner wall of the circular opening and fits snugly against the sleeve 62. The leather or rubber-like ring 53c expands between the periphery of the sleeve 62 and the inner surface of the annular boss 67 that protrudes from the housing of the bearing 5c. The bearing itself has the usual lubrication-retaining seals 57c and 58c and grease fittings for proper lubrication. A drain opening 60c extends from the sleeve 62 to the bottom of the housing, forming a counterpart of drain 60 in FIG. 7, and any fluid from the pump that escapes by the O-ring 49c is mostly drained through the recess 60c without exerting any pressure against the resilient annular seal 53c that might tend to cause the fluid to bypass this second resilient seal.

Another important feature of the embodiment just described is the ease with which the pump may be assembled and disassembled. Dowels 70 and 71, FIG. 1, extending into both the end plate 2 and the casing 1, assure the perfect alignment of the casing with respect to this end plate, and a second group of dowels 72 and 73 assure the similar alignment of the outer end plate 3 with respect to the casing. These dowels, however, may be omitted if the oscillating partitions are supported in any of the ways illustrated and described herein, rather than as shown in the aforementioned earlier patents, and if some such means as that illustrated in FIG. 7 is used to assure a perfect fit between the bearing housing and the casing in which the impellers are located.

Figures 1, 2:
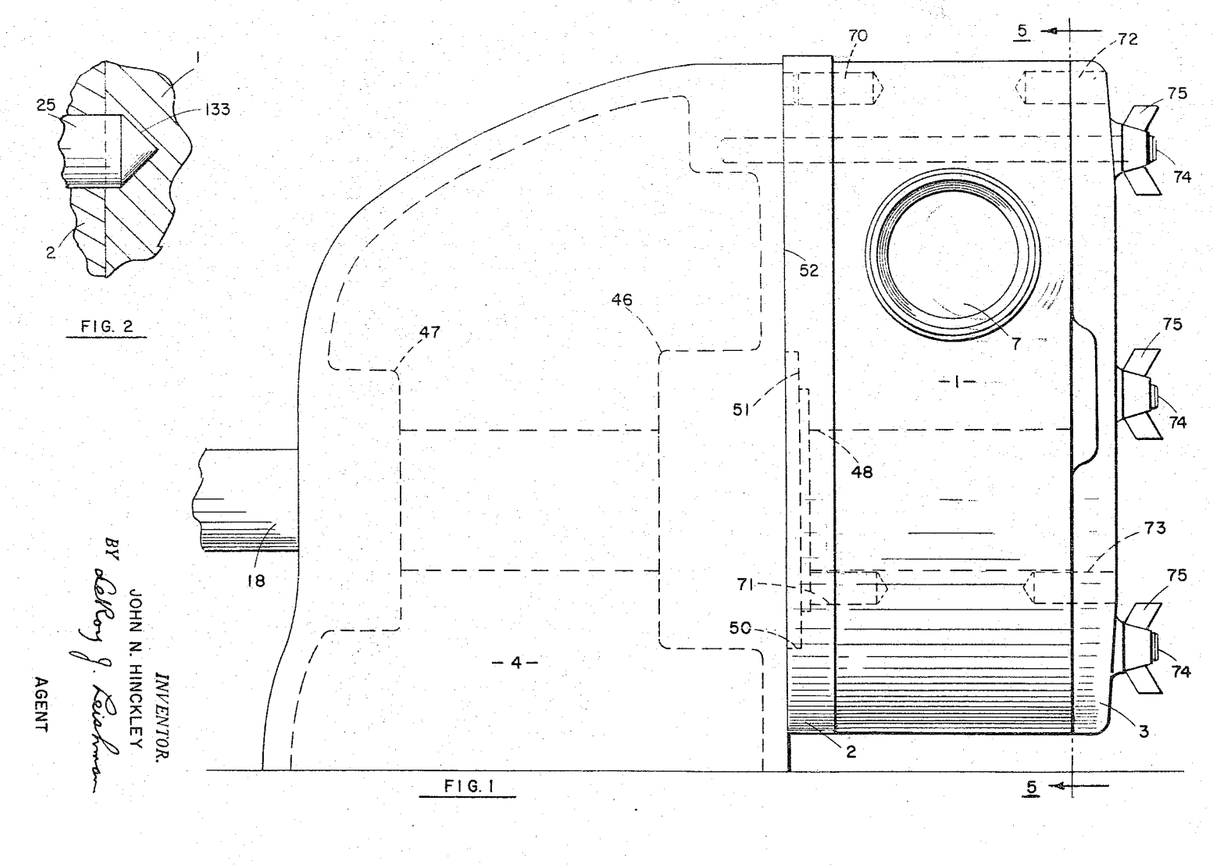
FIGURE 1 is a side elevation of one form of the pump showing the simplicity of the impeller casing and the shaft housing, together with certain internal parts in phantom.
FIG. 2 illustrates a method of journaling the oscillating vane mounting shaft in the end plates of the pump housing.

Long bolts 74, threaded on both ends, extend through the wall or body of the casing 1 and also through the end plate 2 and are threaded into the front wall or surface of the housing 4. The outer ends of the bolts 74 receive the wing nuts 75.

It will be seen that by removing these wing nuts, the front plate 3, the casing 1, and the end plate 2 may all be successively removed from the bearing housing 4. The impeller assembly is easily slidable from the driving shaft for cleaning purposes, and any of the vane and arm assemblies may readily be dismantled regardless of whether the arm assembly is spring loaded, magnetically loaded or held against the peripheries of the impellers by gravity.

Figure 19:
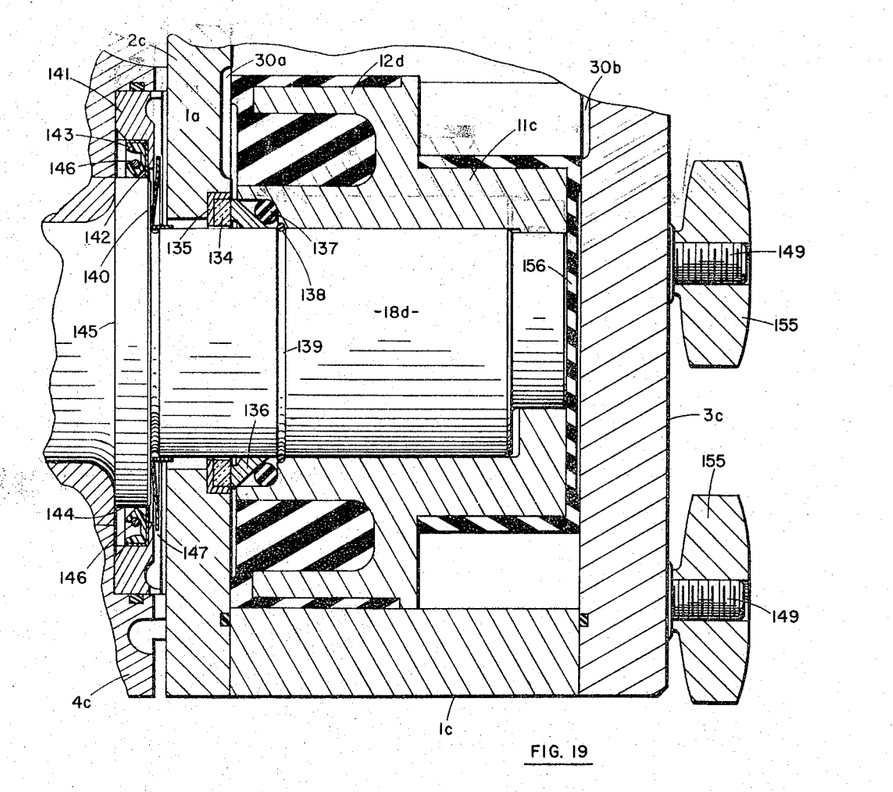
FIG. 19 is a longitudinal section through another embodiment of the invention using an impeller that is completely covered with rubber excepting for the central bore that receives the shaft. This figure also illustrates modified sealing arrangements for preventing the fluid from getting into the shaft bearings.

FIG. 19 illustrates still other modifications in the rotor as well as in the sealing means. The rotor 11c is not formed of a resilient material throughout, but most of the exterior surface is coated with or formed of a resilient material such as neoprene. A resilient substance 156 also completely encases or coats the interior or cored portion excepting for the central opening that receives and fits the drive shaft 18d.

Recess 30a corresponds to recess 30 in FIGS. 3 and 4. Recess 30b is the cooperating recess in the opposite end plate 3c, whereby cushioning fluid is entrained by the opposite impeller. This modification utilizes no recess in the end plates corresponding to recess 31 in FIG. 3, as it has been found that a better hydraulic balance is obtained with only the single set of oppositely disposed recesses in the end plates.

FIG. 19 also illustrates a different form of seal between the impeller casing and the bearing housing. A non-rotating ring 134 that may be suitably formed of carbon or a ceramic material surrounds the shaft 18d and is held in spaced relationship thereto by means of a gasket ring 135 having an L-shaped cross-section. Ring 135 nests in an annular recess 390 in the end plate 1a. Ring 136 fits shaft 18d closely and is keyed to rotate therewith. An O-ring 137 nests in an appropriately formed recess 61 in the impeller 12d and presses on the sloping side of ring 136, urging the opposite vertical face of ring 136 against the ceramic or carbon ring 134. If ring 134 is formed of carbon, ring 136 will operate very satisfactorily therewith if it is formed of a ceramic, but if ring 134 is molded from a ceramic material, then it is well to use carbon for ring 136. Carbon is currently used for this purpose because it has a low coefficient of friction, dissipates heat readily, and can stand high temperatures without distortion. Other metals, or even a plastic, may also be used for this purpose if they have the aforementioned characteristics.

Inasmuch as both the sloping and vertical faces of ring 136 must be capable of making a sealing contact, it is important that they be kept free from blemishes such as can occur if the ring is dropped on a hard surface. Accordingly, a resilient retainer or guard ring 138 is provided to keep ring 136 from being accidentally brushed from shaft 18d during disassembly and to prevent its slipping from the shaft if the pump is tilted at too great an angle when the rotor is not on the shaft. Ring 138, the retainer ring, is held by its own resilience in groove 139.

The substantially L-shaped resilient ring 140 fits closely against shaft 18d and serves to throw off any fluid that passes rings 136 and 134 and the gasket 135, thus preventing such fluid from reaching the vicinity of the bearings. An annular casting 141 has a radially extending inner lip that is interposed between the outer portion of ring 140 and another sealing assembly that comprises parts 142, 143 and 146. Part 142 is an annular ring having an L-shaped cross-section. Into this is cemented a resilient rubber-like ring 143. The garter-ring 146 urges the portion of ring 143 immediately adjoining the periphery 144 of the enlarged section 145 of the drive shaft into sealing engagement therewith. Fluid that may pass the sealing members to the right of ring 140 and which is thrown outward by this ring is received in the annular recess 147 which communicates with the drain described in connection with previously discussed figures.

Figure 20:
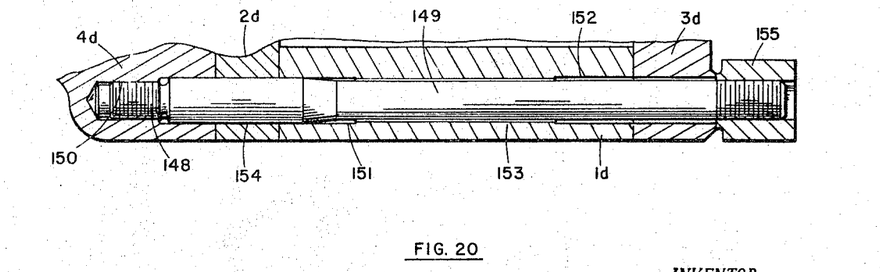
FIG. 20 illustrates the use of a combination dowel and screw for attaching the end plates to the central housing.

FIG. 20, as already mentioned, illustrates a combination bolt and dowel arrangement that not only assures the proper positioning of the end plates 2c and 3c with respect to the casing 1c, but also secures these members to the bearing housing 4c. Perhaps the most important feature of this arrangement, however, is that it permits the casing to be reversed with respect to the end plates for either clockwise or counterclockwise operation of the rotor, thus allowing the fluid to be pumped therethrough in whichever direction may be most convenient for the particular installation.

The threaded end 148 of the dowel-bolt 149 is screwed into the correspondingly threaded hole 150 in the bearing housing 4d. A bolt hole 153 extends all the way through the wall of casing 1d. As shown in the figure, it has a counterbore 151 on the left side to match the large diameter 154 of the bolt 149. An appropriate opening through end plate 2d also closely fits the enlarged portion 154, which constitutes the dowel section of the dowel-bolt 149.

In assembly, the bolt 149 is first inserted through the plate 2d and then screwed into the bearing housing 4d. The portion of the bolt 149 to the right of the enlarged section 154 is reduced in diameter to permit the casing 1d to be slipped over the bolt, whose smaller diameter fits the narrower opening in the housing 1d between the two counterbores 152 and 152. With this arrangement, it will readily be seen that the end of the casing that normally adjoins end plate 3d could be reversed and placed against the end plate 2d, thus permitting a reversal of the positions of the inlet and outlet ports of the pump.

After the end plate 3d has been slipped over the outer end of the bolt, the wing nut 155 is threaded thereon and tightened into position to hold the entire assembly firmly together.

It will of course be understood that other dowel-bolts such as dowel-bolt 149 are used in other locations around the end plates and pump casing to hold them firmly together. The required plurality of bolts is indicated in FIG. 19, where two such bolts are shown with their associated wing nuts 155.

Figure 21:
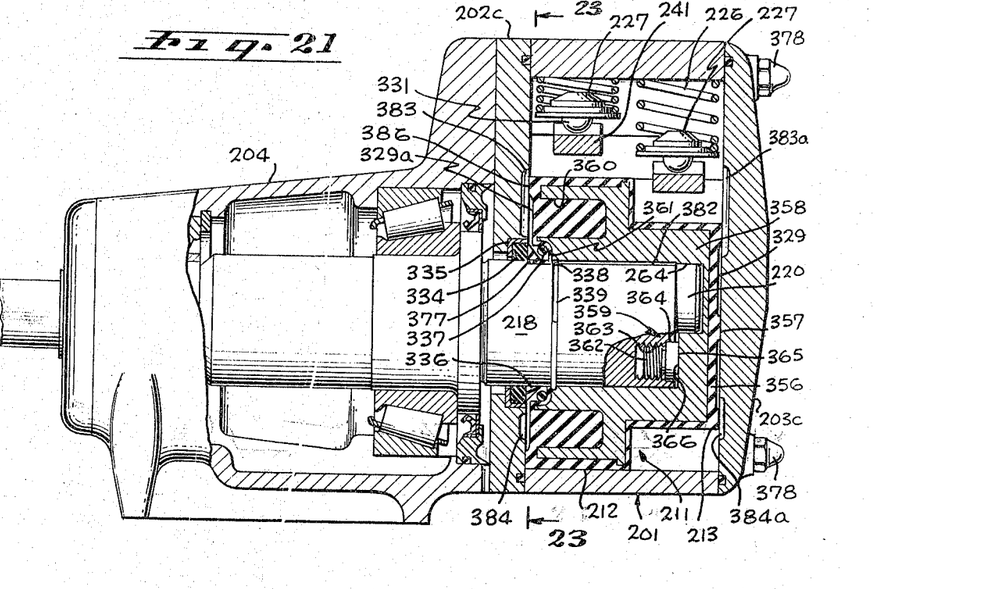
FIG. 21 is a side elevation, partly broken away, of another embodiment of the invention in which all pressure or vacuum forces that are exerted axially on the rotor are exerted in the same axial direction and in which all tolerance variations are compensated for by a novel tolerance accumulation device.
Figure 22:
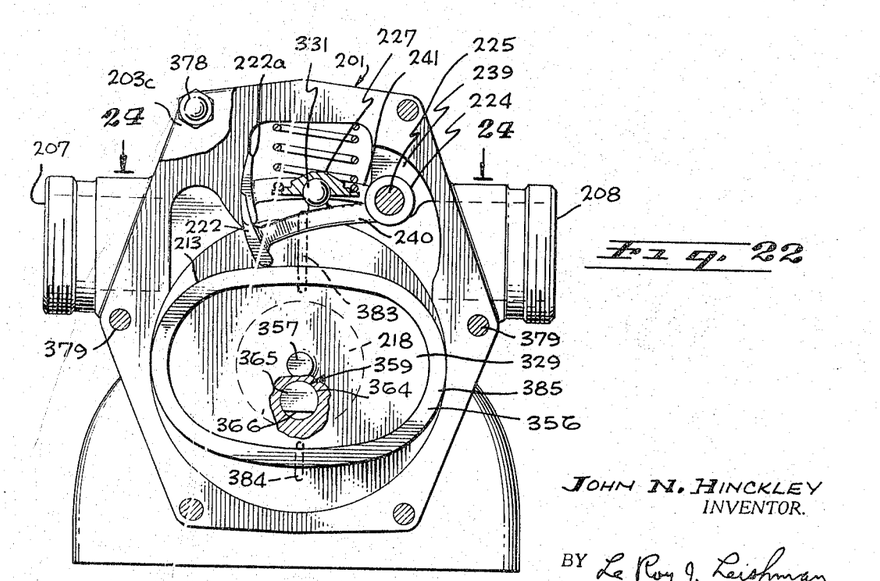
FIG. 22 is a right end view of the pump shown in FIG. 21 with the right end plate removed.

FIGS. 21 to 25 illustrate an embodiment of the invention that is an improvement over those hereinbefore described. It perhaps most closely resembles the structure shown in FIGS. 13 and 19. The drive shaft 218, FIGS. 21 and 22, is the counterpart of the drive shaft 18c of FIGS. 13 and 18d of FIG. 19, and the eccentric end portion 220 corresponds to the similar end portion 20c of FIG. 13.

The impeller 212, which is a counterpart of the impeller 12c of FIG. 19, has a casing 356 of natural or synthetic rubber. This casing is recessed at 329 excepting for a central button portion 357 which protrudes about .002″ beyond the outer rim that surrounds the recess 329. This protruding central portion 357 abuts against the inside surface of the end plate 203c.

The impeller 212 has an opening 264 therein to receive the eccentric end portion 220 of the drive shaft 218, but the end 220 does not bottom in the recess 264, for reasons that will hereinafter become apparent.

The core 358 of the impeller 212 is completely encased by artificial or synthetic rubber or plastic excepting where the core engages the periphery of the drive shaft and the outer end that faces the end plate 202c. The core 358 has an annular recess 360 filled with the same resilient material that surrounds the core. The outer portion of the impeller and the core are thus interlocked, as well as bonded together.

The rotor has an annular L-shaped recess 361 in the outer end thereof communicating with the periphery of the drive shaft 218. An O-ring 337 nests in this recess. This ring abuts against the sealing ring 336 which surrounds the drive shaft 218 and is keyed thereto in a manner later to be explained. The vertical side of the sealing ring engages the stationary ring 134 which at present is preferably formed of carbon or a ceramic material. This ring nests in the gasket 335. The ring 334 and the gasket are the counterparts of the corresponding components in the previously described embodiments.

The hydraulic pressure or vacuum of the material that is being pumped exerts a pressure on the right end surfaces of the impeller thus forcing the O-ring 337 tightly against the sloping surface of the sealing ring 336, pressing it against the stationary ring 334, as hereinbefore described in connection with the similarly numbered counterparts previously described. It is important, however, that the end thrust be borne primarily by the thrust bearings in the bearing housing 204. In the structure illustrated in FIG. 21, these are tapered roller bearings, but it will be readily understood by those skilled in the art that other types of thrust bearings may be substituted.

In order to direct the axial thrust against these bearings, it is of course essential that the pressure exerted against the impeller be transmitted to the shaft 218. In previously described embodiments, such as that illustrated in FIG. 19, this thrust is directed against the eccentric reduced end of the drive shaft which bottoms in the recess of the impeller core, as perhaps best shown in FIG. 13. Great manufacturing precision would obviously be required to so form the parts that this bottoming occurs just when the sealing ring, such as ring 136 in FIG. 19, is exerting the optimum pressure against the stationary ring 134. Variations in manufacturing tolerances make this a very difficult condition to obtain. Accordingly, a tolerance accumulation device 359, shown in FIGS. 21 and 22, is provided. With suitable adaptive variations that will readily occur to those skilled in the art, this tolerance accumulation device may be used in all other embodiments of the invention.

The inner end or shank of this member 359 is provided with male threads 362 that cooperate with female threads 363 in the main body portion of the shaft. These threads are coated with a suitable epoxy so that the final adjustment of the tolerance accumulation device may be maintained. The enlarged outer end 364 of the tolerance accumulation device protrudes from the main body of the shaft for engagement with the vertical inner surface 366 of the rotor core 358. The head 364 of the tolerance accumulation device is recessed on one edge to provide a flat portion 366 to receive a special wrench for rotating the device in order to screw it in and out of the end of the shaft for a precise adjustment. By means of suitable instruments which per se form no part of the present invention, the tolerance accumulation device is adjusted so that its flat outer end 365 engages the vertical inner surface 366 of the core when the compression forces on the O-ring 337 and the stationary seal 334 are at their optimum value. Sufficient depth must be provided in the recess 264 to make sure that the reduced end 220 never engages the bottom of the recess and that the axial thrust of the impeller is always received by the tolerance accumulation device which transmits it to the thrust bearings in the bearing housing 204.

The entire construction of the rotor assembly is such that it may be easily and rapidly disassembled for cleaning and reassembled with equal ease. After removing the nuts 378 from the bolts 379, the end plate 203c may be withdrawn and the rotor 212 pulled from the drive shaft 218. The sealing O-ring 337 will usually remain in its L-shaped nest in the open end of the rotor, but may easily be removed if desired.

The ring 336 has a nodule 377 on its inner surface that extends radially therefrom to engage the flat portion 382 on the shaft. This flat portion cooperates with the nodule for keying purposes in lieu of a conventional keyway. The ring 336 may be slipped from the shaft after first removing the restraining O-ring 338. During reassembly, the ring 336 must of course be oriented so that the nodule 377 engages the flat portion 382 of the shaft. The O-rings 377 and 338 should then be replaced and the rotor 212 slipped back over the end of the shaft with the reduced diameter extreme end portion of the shaft extending into the recess 264 within the core 358.

Figure 23:
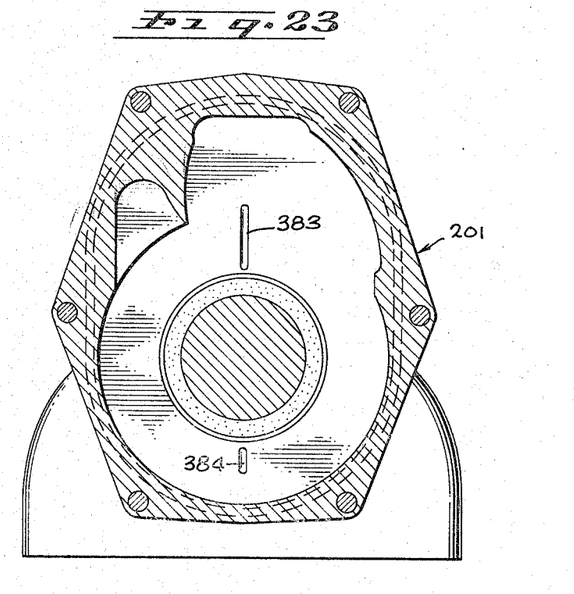
FIG. 23 is a section taken substantially on line 23—23 of FIG. 21.

Structural features have been provided in the embodiment shown in FIGS. 21, 22 and 23 to permit the pump to be flushed or cleaned without disassembly. This practice has come to be known in the food industries as clean-in-place, or simply CIP. For such cleaning, water is pumped through the rotor housing 201 from the inlet opening 207 and thence through the outlet port 208 in the manner in which the food products are pumped therethrough, suitable cleaning chemicals being added to the water, depending somewhat upon the nature of the residue from previous pumping operations that are to be removed from the pump.

Interconnecting passageways are provided to permit the cleaning fluid to reach the flexible O-ring 337 and the sloping sided sealing ring 336. Certain of these passageways are formed in the end plates 202c and 203c, end plate 202c having a groove 383 above the central opening through which the drive shaft passes and another groove 384 positioned below the central opening in the end plate. Both of these grooves are spaced and separated from the central opening by solid portions of the end plate. Corresponding cleaning grooves 383a and 384a are provided in the outer end plate 203c. The recess 383a communicates with the recessed portion 329 in the closed end of the rotor. This permits the cleaning fluid to flow from the groove 383a through the recess 329 and thence out of the recess 384a into the rotor chamber in the housing.

The open end of the rotor 211 within the impeller 212 has a shallow recess 329a surrounding the L-shaped recess 361 and communicating therewith. The recess 329a is bonded by the rim 386 of the impeller. Fluid may enter the groove 383 at any time, as it extends radially beyond the portions traversed by the impeller rim. The recess 329a communicates with the sloping surface of the sealing ring 336 and with the adjacent surface of the O-ring 337, and the fluid may flow 180° around the ring 336 to its opposite side where the space adjacent thereto communicates with the lower groove 384 in the end plate. This lower groove is closed when the lobes of impeller 212 are in vertical alignment, but it is open to the region below the lobes when they are disposed horizontally. Likewise, the cleaning groove 383a in end plate 203c is always open, and the lower groove 384 is open only when the lobes of impeller 213 are horizontally disposed. It should thus be clear that the two lower cleaning slots 384 and 384a are open alternately while the upper cleaning slots 383 and 383a are always open.

Figure 11:
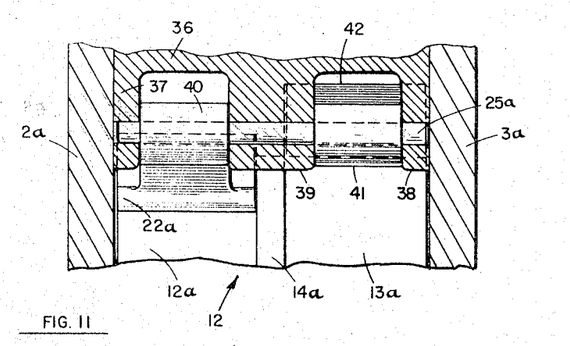
FIG. 11 is a broken-away view of a portion of the rotor housing of one embodiment of the invention, showing one position of each of the two vanes that cooperate with the rotors, not shown.
Figure 12:
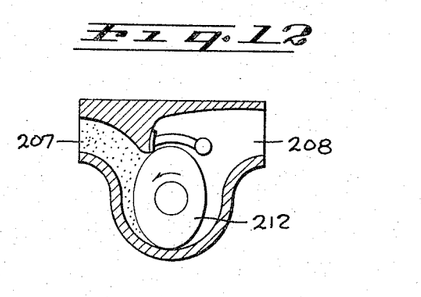
Figure 24:
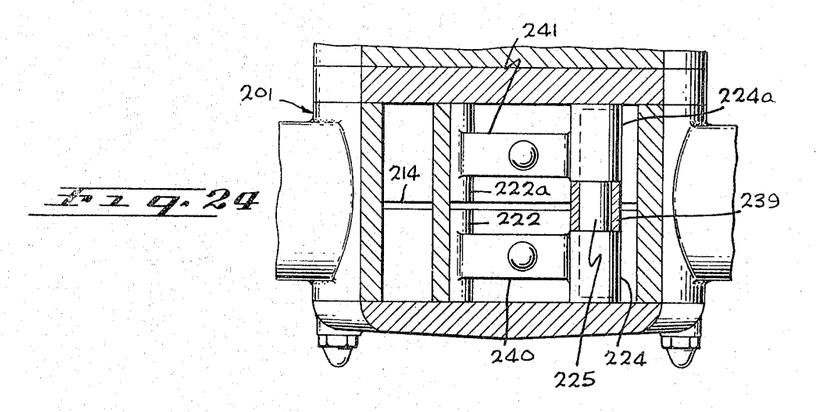
FIG. 24 is a section taken substantially on line 24—24 of FIG. 22.
Figure 25:
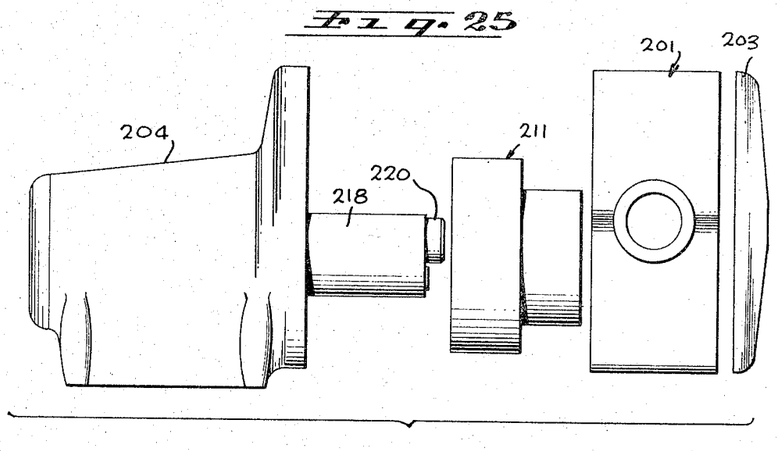
FIG. 25 is an exploded view of the pump shown in FIG. 21.

Still other novel features are included in the embodiment illustrated in FIGS. 21, 22 and 24, the latter figure being a section taken on line 24—24 of FIG. 22. This figure shows an improved construction for the reciprocating vanes, as well as for the structure by means of which they are mounted. In the previously described FIG. 11, for example, the vanes were mounted on a shaft 25a passing through a central internal projection 39 of the main housing and into side portions 37 and 38 thereof; and the hub of arm 40 of the vane 22a was confined between the portions 37 and 39 of the housing, while the hub of arm 41 of the companion vane was confined between the central support 39 and the outer support 38 that holds the right end of the shaft 28 when these parts are oriented as they are shown in FIG. 11.

The arrangement shown in FIG. 24 is much easier to assemble and disassemble than the structure just described. In this embodiment, there is a central support 239 that is integral with the housing, but there are no side or end supports corresponding to the supports 37 and 38 of FIG. 11. The single support 239 is adequate. The reciprocating structures 240 and 241 embodying the vanes 222 and 222a are integral respectively with hubs 224 and 224a. These hubs, it will be observed, are offset with respect to the arms and the vanes, but inasmuch as each hub abuts against the neighboring end plate and reaches only to the central support 239 rather than to the plane of the central disc 214 that spaces the impellers, the offset arrangement of the hubs accurately positions the vanes 222 and 222a with respect to the impellers with which they individually cooperate. During assembly, the support shaft 225 is inserted through the central support 239 and cemented or welded in place. The oscillating structure 240 is then placed in position by sliding its hub 224 over the end of the shaft 225. The arm 241 is similarly mounted.

The vanes 222 and 222a are held against the peripheries of impellers 213 and 212 respectively by the springs 226 and the caps or bosses 227 that ride upon the balls 331 which are integral with the oscillating arm. This structure and the cooperation of the various elements making it up has been described in connection with the mechanism illustrated in FIG. 5.

Figure 26:
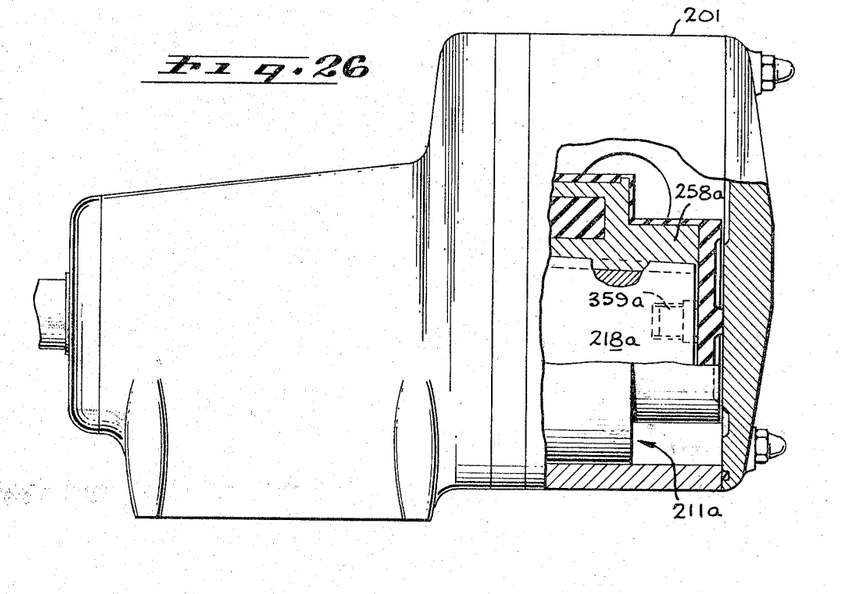
FIG. 26 is a side elevation, partly cut away, of an embodiment utilizing a tapering drive shaft.
Figure 27:
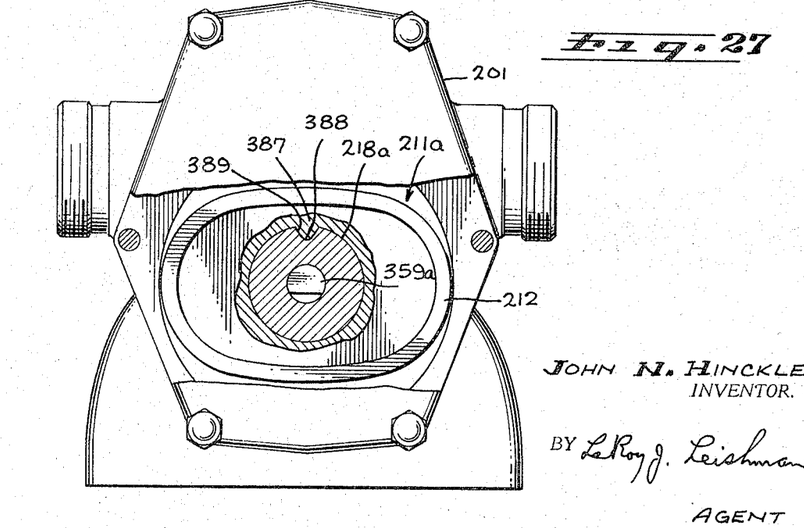
FIG. 27 is a front elevation, partly cut away, of the embodiment shown in FIG. 26.

FIGS. 26 and 27 illustrate an embodiment utilizing a tapering drive shaft 218a. The core 258a of the rotor 211a has a tapered cavity therein that mates with the tapered drive shaft 218a.

In order to key the rotor 211a to the drive shaft 218a, a generally V-shaped recess or keyway 387, FIG. 27, extends axially along the outside of the shaft. The bottom 388 of this keyway is curved in order to eliminate corners that impede cleaning. A companion key 389 is formed on the interior wall of the large cavity within the rotor core.

The drive shaft for this embodiment of course requires no offset outer end such as the boss 220 in the previously described embodiment, and the absence of this boss makes it possible to place the tolerance accumulation device 359a in the exact center of the shaft, as shown in FIGS. 26 and 27. Inasmuch as this tolerance accumulation device is the same in all other respects as that shown in the previously described embodiment, additional structural details will not be described. For similar reasons, reference to structural features of the rotor that are identical in this embodiment to the corresponding features described in connection with previously described figures are omitted from the present description.

Various modifications may of course be made from the embodiments hereinbefore described and in the components; in fact, any of the elements set forth in the appended claims may be omitted and replaced by other elements performing the same functions or the same functions plus additional functions. Moreover, the location of components may be changed or reversed without departing from the broad spirit of the invention as embodied in the structures set forth in the appended claims.

The inventor claims:

1. In a rotary pump comprising a casing having a circular opening for a shaft and oppositely disposed inlet and outlet ports therethrough communicating with a chamber therein a portion of whose walls most distant from said ports are concentric with said opening, a combination including: a drive shaft concentric with said opening extending therethrough into said chamber and terminating therein; a bearing structure for said shaft disposed exteriorly of said chamber, the end of said shaft within said chamber being free from support; a removable impeller entirely closed at one end and having a recess in its other end that slidably receives the unsupported end of the drive shaft; means for keying said impeller to said shaft for rotation therewith; said impeller having spaced peripheral portions that sweep said concentric portion of said walls; and instrumentalities interposed between said ports for directing the inflow from said inlet port toward said concentric portion of the walls whereby said inflow may be moved along said portion of said walls toward said outlet port by said spaced peripheral portions.

2. The combination set forth in claim 1 in which the casing comprises a central cylindrical section closed at its opposite ends by front and rear plates, said rear plate having the circular opening therein, and in which the impeller has a minimum diameter at right angles to a maximum diameter to form opposite lobes that constitute the said spaced peripheral sections and in which the said instrumentalities includes a partition across the space between the ports, said partition extending from one of said plates to the other and from the path traversed by said lobes to a portion of the walls of the chamber opposite from those that are concentric with said opening, said instrumentalities also including an oscillating member pivotally carried by a support that is fixed with respect to said casing, said oscillating member traversing the side of said partition opposite from said inlet port and continuously bearing against the periphery of said impeller to close the varying gap between the partition and the impeller as the impeller rotates.

3. The combination set forth in claim 1 in which the casing has an annular cavity therein concentric with said opening to provide a shoulder around the opening, said cavity communicating with said opening as well as with the inside surface of said casing, the impeller having a concentric recess in the end thereof facing said opening, and to which said combination is added sealing instrumentalities to prevent the escape through said opening of material being propelled through said casing by said spaced peripheral portions, said sealing instrumentalities comprising: a resilient ring loosely surrounding said shaft within said recess; an annular gasket mounted within said cavity; a first collar on said shaft between said gasket and said ring; a second collar closely surrounding said shaft between said first collar and said ring; said second collar having a first side engaging said first collar and said second collar so conically shaped that it may extend partially within said resilient ring; said ring acting to force said collars against said gasket when axial pressure is exerted on said impeller in the direction of said opening.

4. The combination set forth in claim 1 in which the means for keying the impeller to the shaft for rotation therewith comprises: a projection on the end of the shaft, the periphery of the projection having angularly spaced portions thereon that vary from each other in their distances from the axis of the shaft, no portion on the periphery of said projection extending beyond the shaft's periphery; and in which the recess in the impeller has a first portion that slidably receives said shaft and a second portion that matches, embraces and slidably receives said projection.

5. The combination set forth in claim 1 in which the drive shaft tapers toward its free end and has a concave groove extending longitudinally along its periphery from said free end, and in which the said recess in the impeller is tapered to fit the taper of said shaft and so shaped that a portion of the walls of the recess project internally to nest within said groove and key the impeller against angular movement with respect to the shaft.

6. The combination set forth in claim 1 in which the bearing structure comprises a thrust bearing and in which the open end of the recess in the impeller is offset to form an annular shoulder within the open end of the impeller and to which said combination is added: a circular assembly surrounding said shaft between said shoulder and the portion of the casing surrounding said circular opening, said assembly comprising a resilient ring positioned against said shoulder; and a tolerance accumulation device adjustably protruding from the end of the shaft, said tolerance accumulation device having male threads thereon in threaded engagement with female threads in the shaft, the end of said device being provided with means to facilitate its manual rotation for adjusting the extent of its protrusion; said device acting when suitably adjusted to be engaged by the bottom of said recess and transmit any force applied to the closed end of the rotor to the shaft and thence to the thrust bearing after said circular assembly has first begun to bear against said portion of said casing.

7. The combination set forth in claim 2 with the addition of a second impeller like that defined in claim 2, the two impellers being integrally formed with their respective maximum diameters at right angles to each other and with an integral disc between them having a diameter equal to said maximum diameter; said instrumentalities including a second oscillating member bearing against the periphery of the second impeller and traversing a portion of said partition adjacent to that traversed by the other oscillating member, said members being pivotally mounted on opposite sides of said support.

8. The combination set forth in claim 7 in which each of said members includes a hub, the members being pivotally mounted by means of a shaft passing through both members and through the intervening support, the total axial distance across the two hubs when mounted on said shaft being only slightly less than the distance between said end plates, the portions of the oscillating members that traverse the partition being so constructed and located with respect to the hubs that each is automatically positioned between said disc and a different one of said end plates.

9. The combination set forth in claim 2 with the addition of a plurality of at least partially removable dowels each extending both into said cylindrical body and into said rear plate.

10. The combination set forth in claim 9 with the addition of a plurality of bolts each passing through said front plate, then axially through the wall of said cylindrical body, thence through said rear plate, and finally anchored in said housing to clamp them all together.

11. The combination set forth in claim 2 in which the bearing structure comprises a housing, said housing adjoining said rear plate, said bearing housing having blind holes therein opening toward said casing, said blind holes threaded near their inner ends and provided at their outer ends with counterbores of the same diameter as those in said casing, said holes in said housing positioned to align with those in said plates and casing; and to which said combination is added a plurality of dowel-bolts individual to the holes in said housing, each of said dowel-bolts having (a) a first section threaded into the threaded portion of one of the holes in said housing, (b) a second section adjacent said first section and having substantially the same diameter as said counterbores, said second section extending through the counterbore adjacent the threaded portion of the hole into which the dowel-bolt is threaded, then through an aligned hole in said rear plate and into an aligned counterbore in said casing, (c) a third section of reduced diameter extending from the last mentioned counterbore through the remainder of the hole in the casing and then through an aligned hole in said front plate, and (d) a threaded end at least a portion of which protrudes through said front plate for threaded engagement with a clamping nut.

12. The combination set forth in claim 3 in which one of said collars is formed of carbon and the other of ceramic material to minimize the friction therebetween.

13. The combination set forth in claim 3 in which the bearing structure comprises a housing, said housing having a circular compartment in the wall thereof surrounding said shaft but spaced therefrom and adjoining said casing; and a guard member comprising a band and a flange, said band gripping said shaft within said opening in said casing, and said flange extending into said chamber and acting to deflect therein whatever fluid from said casing may escape beyond said collars.

14. The combination set forth in claim 12 in which there is an annular groove in the casing extending radially from said circular opening and an O-ring nesting in said groove and embracing said shaft to serve as an additional seal against the escape of material from said casing through said opening.

15. The combination set forth in claim 13 in which there is an annular groove in the casing extending radially from said circular opening and an O-ring nesting in said groove and embracing said shaft to serve as an additional seal against the escape of material from said casing through said opening.

16. The combination set forth in claim 3 with the addition of an elongated metal cap for slidably encasing the unsupported end of said shaft, said cap comprising a sleeve portion keyed to said shaft and extending through said opening, the impeller being bonded to said cap, said casing having an annular groove therein extending radially from said circular opening and said sealing instrumentalities comprising an O-ring nesting in said groove and embracing said sleeve.

17. The combination set forth in claim 16 in which the cap that comprises a sleeve is a cylindrical tube with a disc sealed across one end thereof.

18. The combination set forth in claim 3 in which the shaft is provided with an annular groove surrounded by said impeller adjacent the recess therein, there being an O-ring nesting in said groove to prevent the resilient ring recited in claim 3 from rolling from the shaft upon removal of the impeller.

19. The combination set forth in claim 3 in which at least all the external surface portions of said impeller are formed of elastomeric material, there being an axially extending rim around the end of the impeller adjacent its periphery, the internal surface of the casing surrounding said opening being substantially flat, and having first and second grooves therein, said first groove positioned above said central opening and said second groove positioned below said opening, both of said grooves communicating with the conical surface of said second collar via the portion of the end of the impeller that is surrounded by said rim, said first groove extending vertically above the portion of said internal surface that is traversed by said impeller and said second groove extending downward sufficiently for its lower end to be exposed only between said spaced peripheral portions of the impeller, said grooves acting when the casing is being flushed to entrain cleaning fluid through said first groove and expel it from the bottom of said second groove.

20. The combination set forth in claim 16 in which the impeller contains a solid, non-elastomeric core to give it substantial rigidity and dimensional stability.

21. The combination set forth in claim 3 in which the bearing structure recited in claim 1 comprises an external member having a generally flat surface at least a portion of which is in contact with the adjacent surface of said rear member; there being a passageway in at least one of said members leading generally upward from the bottom thereof toward said shaft to afford a drain for flowable material that may escape through said sealing instrumentalities.

22. The combination set forth in claim 16 with the addition of a sealing ring encircled by an annular shoulder protruding from the surface of the bearing structure of claim 1 that adjoins said casing, said sealing ring embracing the portion of said sleeve that extends through said O-ring, said sealing ring acting as a seal for the bearing.

23. The combination set forth in claim 3 in which the end of the casing opposite from said opening has a flat inside surface and in which at least all the external surface portions of said impeller are formed of elastomeric material, and there being an axially extending rim around each end of the impeller adjacent its periphery, the internal surfaces of each end of the casing being swept by the rim of the adjacent end of the impeller and having first and second grooves therein, the upper end said first groove extending above the portion of said internal surface that is traversed by said rim and the lower end of said second groove extending downward sufficiently to be exposed only between said spaced peripheral portions of the impeller, both of the first grooves acting when the casing is being flushed to entrain cleaning fluid and conduct it into the spacial area encompassed by said rim, and both of the second grooves acting to drain said fluid from said area.

24. The combination set forth in claim 6 in which the end of the casing opposite from said opening has a flat inside surface and in which at least all the external surface portions of said impeller are formed of elastomeric material, there being an axially extending rim around each end of the impeller adjacent its periphery, the internal surface of the end of the casing having the central opening therein being swept by the rim of the adjacent end of the impeller, the end of the impeller adjacent the opposite end of the casing having a central boss extending beyond the surrounding rim and substantially engaging the end of the casing adjacent thereto, the boss acting to limit the movement of the impeller in one axial direction and the tolerance accumulation device acting to limit the movement of the impeller in the opposite axial direction.

25. The combination set forth in claim 4 in which the second portion of said recess has a plurality of arcuate sides whose radii are each greater than the greatest distance from the associated side to the axis of the shaft, and in which said projection has a peripheral contour that matches the arcuate sides of the second portion of said recess.

26. The combination set forth in claim 4 in which the second portion of said recess has cylindrical walls that are eccentrically disposed with respect to said axis and in which said projection has a cylindrical periphery that nests within the second portion of said recess.

References Cited by the Examiner

UNITED STATES PATENTS

| | | | |
|---|---|---|---|
| 2,010,525 | 8/1935 | McHugh | 287—53 |
| 2,462,481 | 2/1949 | Estey | 103—136 |
| 2,482,229 | 9/1949 | Weaver | 287—52 |
| 2,533,252 | 12/1950 | Hinckley | 103—124 |
| 2,541,405 | 2/1951 | Chapman | 103—136 |
| 2,717,555 | 9/1955 | Hinckley | 103—124 |
| 2,796,030 | 6/1957 | Nebel | 103—124 |
| 2,809,595 | 10/1957 | Adams et al. | 103—217 |
| 2,882,828 | 4/1959 | Hinckley | 103—124 |
| 2,952,249 | 9/1960 | Conover | 103—136 |
| 3,240,157 | 3/1966 | Hinckley | 103—124 |

DONLEY J. STOCKING, *Primary Examiner.*

W. J. GOODLIN, *Assistant Examiner.*